(12) United States Patent
Day et al.

(10) Patent No.: US 7,996,386 B2
(45) Date of Patent: *Aug. 9, 2011

(54) TRACKING PREMATURE TERMINATION OF A DATABASE QUERY

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 380 days.

This patent is subject to a terminal disclaimer.

(21) Appl. No.: 12/353,599

(22) Filed: Jan. 14, 2009

(65) Prior Publication Data

US 2009/0119249 A1 May 7, 2009

Related U.S. Application Data

(63) Continuation of application No. 11/132,659, filed on May 19, 2005, now Pat. No. 7,493,306.

(51) Int. Cl.
*G06F 17/30* (2006.01)
(52) U.S. Cl. . 707/713; 707/718; 707/721; 707/E17.017; 707/E17.14
(58) Field of Classification Search .............. 707/713, 707/718, 721, E17.017, E17.061, E17.135, 707/E17.14, 999.002, 999.107
See application file for complete search history.

(56) References Cited

U.S. PATENT DOCUMENTS

| | | | |
|---|---|---|---|
| 5,304,545 | A | 4/1994 | Mentink et al. |
| 5,305,454 | A | 4/1994 | Record et al. |
| 5,819,251 | A | 10/1998 | Kremer et al. |
| 5,946,484 | A | 8/1999 | Brandes |
| 6,006,223 | A | 12/1999 | Agrawal et al. |
| 6,122,663 | A | 9/2000 | Lin et al. |
| 6,519,637 | B1 | 2/2003 | Arkeketa et al. |
| 6,633,867 | B1 | 10/2003 | Kraft et al. |
| 7,130,838 | B2 | 10/2006 | Barsness et al. |
| 2001/0033556 | A1 | 10/2001 | Krishnamurthy et al. |
| 2004/0172385 | A1* | 9/2004 | Dayal ............... 707/3 |
| 2006/0085854 | A1* | 4/2006 | Agrawal et al. ........... 726/23 |
| 2006/0114921 | A1* | 6/2006 | Nakajima ............. 370/412 |
| 2006/0248514 | A1* | 11/2006 | Messmer et al. ........... 717/127 |

* cited by examiner

*Primary Examiner* — Leslie Wong
(74) *Attorney, Agent, or Firm* — Wood, Herron & Evans, LLP (57) ABSTRACT

An apparatus and program product that utilize at least one prematurely terminated processing of a database query to improve the processing of the database query. The embodiments discussed track termination information associated with at least one user initiated premature termination of processing of a database query to improve the processing of the database query. Information related to the premature terminations of a database query may be utilized by a DBMS to generate and/or implement suggestions to improve the processing of the database query, resulting in improved query processing, improved performance, fewer premature terminations, and more satisfied users.

17 Claims, 3 Drawing Sheets

TRACKING PREMATURE TERMINATION OF A DATABASE QUERY

CROSS-REFERENCE TO RELATED APPLICATIONS

This application is a continuation of U.S. patent application Ser. No. 11/132,659, filed on May 19, 2005, by Paul Reuben Day et al., the entire disclosure of which is incorporated by reference herein.

FIELD OF THE INVENTION

The invention relates to database management systems, and in particular, to the processing of database queries by database management systems.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems. From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database.

Furthermore, significant development efforts have been directed toward query "optimization," whereby the execution of particular searches, or queries, is optimized in an automated manner to minimize the amount of resources required to execute each query. A query optimizer typically generates, for each submitted query, an access plan. In generating an access plan, a query optimizer typically creates multiple potential access plans, and selects the best among those potential access plans based upon the "cost" of each plan. The cost of each plan represents the amount of resources expected to be utilized by the plan (typically expressed in the expected amount of time to execute), and as such, selecting the plan with the lowest cost typically results in the most efficient (and quickest) execution of a query.

Despite the significant hardware, software, and optimization advances, some queries may still spend a long time executing or processing, particularly when queries are complex and/or the tables involved are large. For example, statistical imprecision during optimization may result in the selection of a suboptimal access plan and a long processing query. Queries may also spend a long time processing due to poor table configurations. For example, a poorly configured table may not have a corresponding index and/or statistic, which typically lead to shorter processing times. Thus, queries accessing poorly configured tables typically spend a longer period of time processing than queries accessing more adequately configured tables.

Additionally, other factors during the execution of a query may also increase the processing time of a query. For example, a system resource, such as CPU or I/O resource needed to process a query, may become unavailable or overloaded during the query's processing due to other tasks needing the system resource.

As a result of these and other reasons for long processing queries, a user may become impatient or may not be able to wait for a long processing query to finish executing. For example, the user may want to execute other queries, and because the long processing query may affect the performance of the other queries the user wants to execute, the user may not want to wait for the long processing query to finish processing. Some tools do exist to improve the performance of a long processing query. However, users often do not utilize the tools because the tools may require, for example, advanced user knowledge, manual initiation of a tool, running reports, collecting database monitor records, and/or expert analysis. Particularly for a user lacking advanced knowledge, the user may have to call upon and wait for a database administrator to manually initiate a tool, re-execute the query with the tool, analyze the results, implement improvements, and re-execute the query again with the improvements. Thus, users encountering long processing queries are typically left with only two options, either to wait an additional and usually undetermined amount of time for a long processing query to finish executing, or terminate the query. Users typically choose the latter and terminate long processing queries before the processing completes.

Furthermore, upon terminating the processing of a query before the processing completes, not only did a user waste his or her time and valuable system resources waiting for the query to finish executing, but the user may still not have an answer to the query. Thus, the user typically has to process the query again, often subject to the same delays, and often with a good likelihood that the user will once again grow impatient and terminate the query. This cycle may typically be repeated many times by many users, resulting in more wasted time and unimproved queries. Additionally, other queries may be negatively affected while a long processing query is executing, also resulting in wasted time and resources.

A need therefore exists in the art for improving the performance of queries, and in particular, a more intelligent and user friendly approach to improving the processing of database queries, thus resulting in fewer early terminations of queries, improved performance, and more satisfied users.

SUMMARY OF THE INVENTION

The invention addresses these and other problems associated with the prior art by providing an apparatus and program product that track premature terminations of database queries to improve the processing of database queries. Typically, information related to the premature terminations of a database query may be used to generate and/or implement suggestions to improve the processing of the database query, often resulting in improved query processing and performance, fewer premature terminations, and more satisfied users.

For example, certain embodiments consistent with the invention may detect when a user prematurely terminates the processing of a database query and track termination information related to the premature termination of the database query. Based upon the termination information, at least one suggestion to improve the processing of the database query may be generated and/or implemented. Furthermore, a waiting value can be built for a user who prematurely terminates database queries. Based upon the waiting value, the user may be warned about database queries estimated to spend more time processing than the user typically waits before prematurely terminating a query. Additionally, based upon the waiting value, at least one suggestion may be generated and/or implemented to improve the processing of database queries estimated to spend more time processing than the user typically waits before prematurely terminating a query.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

DETAILED DESCRIPTION

The embodiments discussed hereinafter track termination information associated with at least one user initiated premature termination of processing of a database query to improve the processing of the database query. A "premature" termination of a database query may be practically any time the processing of a database query stops before the processing of the database query completes. Embodiments consistent with the invention may have applicability with practically any type of query that may be prematurely terminated by a user. A user consistent with the invention may be practically anyone capable of issuing queries to a database management system, including an end user or a database administrator. Applications or other programs may also issue and/or prematurely terminate database queries consistent with the invention. Thus, an application or other program may be considered a user consistent with the invention.

Termination information consistent with the invention may be practically any information related to the premature termination of a database query. Termination information for a database query may include, for example, a number of times processing of the database query is prematurely terminated, an amount of processing time before processing of the database query is prematurely terminated, when processing of the database query is prematurely terminated, a system configuration (e.g., priority of the database query, memory allocated to the database query, number of other queries processing when the database query was prematurely terminated, etc.), a user that prematurely terminates processing of the database query, a pattern in how processing of the database query is prematurely terminated, etc. Termination information for a database query may also be user specific, e.g., how many times did a specific user prematurely terminate the database query, how much time or approximately how much time did a specific user allow the query to process before prematurely terminating the query, etc.

Termination information may be used to determine patterns of significance. A pattern for a prematurely terminated query may include the fact that the query is prematurely terminated by many users, the fact that the query is always terminated by the same user, the fact that the query is usually terminated at approximately the same time of day, or after approximately a same amount of time of processing of the database query has elapsed, etc. Additionally, termination information may be used to build a waiting value for a user. A waiting value represents the approximate amount of time a user has historically waited before prematurely terminating processing of at least one database query. Furthermore, suggestions based upon termination information, patterns, and/or waiting values may be created and/or implemented to improve the processing of database queries consistent with the invention. Termination information may be retrieved, stored, and/or updated in an access plan of the database query.

Figure 1:
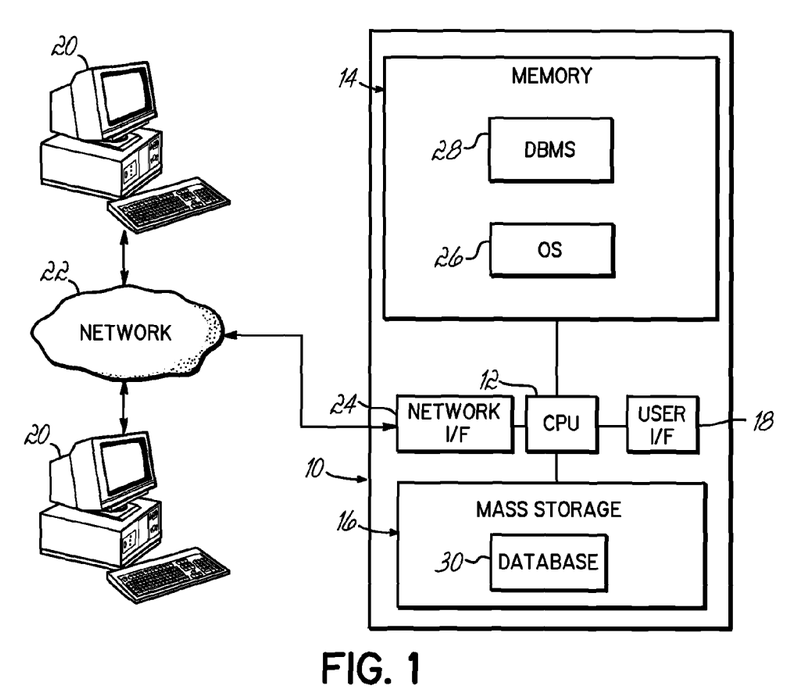
FIG. 1 is a block diagram of a networked computer system incorporating a database management system within which is implemented tracking of premature terminations of database queries consistent with the invention.

Turning now to the Drawings, wherein like numbers denote like parts throughout the several views, FIG. 1 illustrates an exemplary hardware and software environment for an apparatus 10 suitable for implementing a database management system consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non volatile or backup memories (e.g., programmable or flash memories), read only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single user computer 20 coupled to computer 10 over a network 22. This latter implementation may be desirable where computer 10 is implemented as a server or other form of multi user computer. However, it should be appreciated that computer 10 may also be implemented as a standalone workstation, desktop, or other single user computer in some embodiments.

For non volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) 28 may be resident in memory 14 to access a database 30 resident in mass storage 16. Moreover, various applications, components, programs, objects, modules, etc. may also execute on one or more processors in another computer coupled to computer 10 via a network, e.g., in a distributed or client server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non volatile memory devices, floppy and other removable disks, hard disk drives, magnetic tape, optical disks (e.g., CD ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
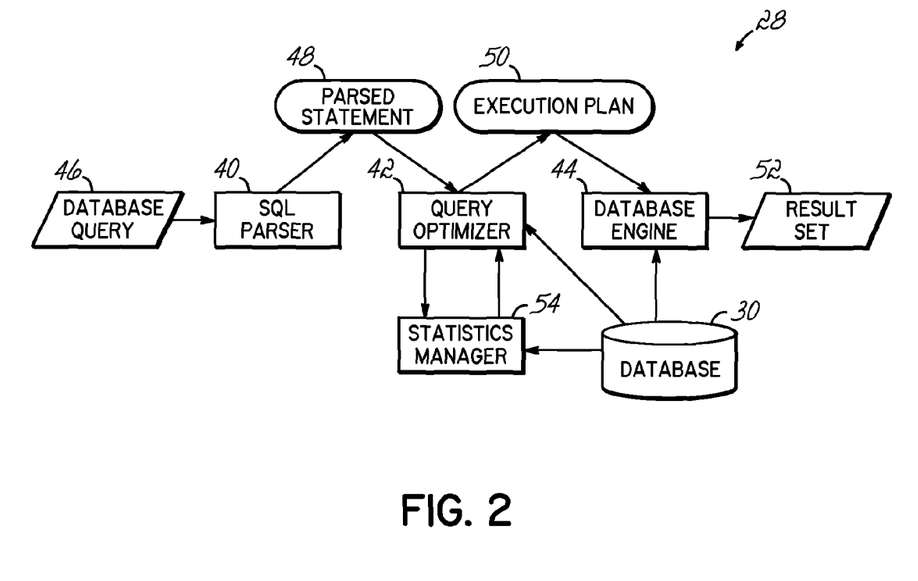
FIG. 2 is a block diagram illustrating the principal components and flow of information therebetween in the database management system of FIG. 1.

FIG. 2 next illustrates in greater detail the principal components in one implementation of DBMS 28. The principal components of DBMS 28 that are generally relevant to query execution are a Structured Query Language (SQL) parser 40, query optimizer 42 and database engine 44. SQL parser 40 receives from a user (or more typically, an application executed by that user) a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated. Once generated, the execution plan is forwarded to database engine 44 for execution of the database query on the information in database 30. The result of the execution of the database query is typically stored in a result set, as represented at block 52.

To facilitate the optimization of queries, the DBMS 28 may also include a statistics manager 54. Statistics manager 54 may be used to gather, create, and/or analyze statistical information using database 30 for the query optimizer 42.

Generally, a DBMS consistent with the invention may perform at least one of the following functions: track termination information of prematurely terminated database queries, determine a pattern, build a waiting value, warn a user based upon a waiting value, generate a suggestion to improve the processing of database queries based upon termination information, pattern, and/or waiting value, and perform an operation after the suggestion has been created. A suggestion consistent with the invention may be practically any suggestion that can improve the processing of a database query. For example, a suggestion may include rescheduling a query, creating a statistic, creating an index, changing a system configuration, etc. A waiting value consistent with the invention may be practically any value that represents an approximate amount of time a user has historically waited before prematurely terminating a database query. The waiting value may be used to warn a user, create suggestions, and/or implement suggestions to improve a database query before the user prematurely terminates a database query.

In the illustrated embodiments, for example, statistics manager 54 may create a statistic based upon a suggestion to improve the processing of a database query from termination information. The query optimizer 42 may reoptimize the database query using the created statistic, and database engine 44 may execute the reoptimized database query. Also, query optimizer 42 may store, retrieve, and/or update termination information as well as a pattern and/or waiting value from an access plan of the database query. An access plan consistent with the invention includes but is not limited to an access plan saved in an access plan cache, an access plan stored in a permanent object, an access plan not saved in an access plan cache, an access plan not stored in a permanent object, etc.

It will be appreciated by those of ordinary skill in the art, however, that optimizer 42, statistics manager 54, database 30, database engine 44, and/or other components may be accorded different functionality in some embodiments. Moreover, components may be added and/or omitted in some embodiments. Those of ordinary skill in the art will also recognize that the exemplary implementation of DBMS 28 illustrated in FIG. 2 is not intended to limit the present invention. Indeed, those skilled in the art will recognize that other alternative hardware and/or software environments may be used without departing from the scope of the invention.

Figure 3:
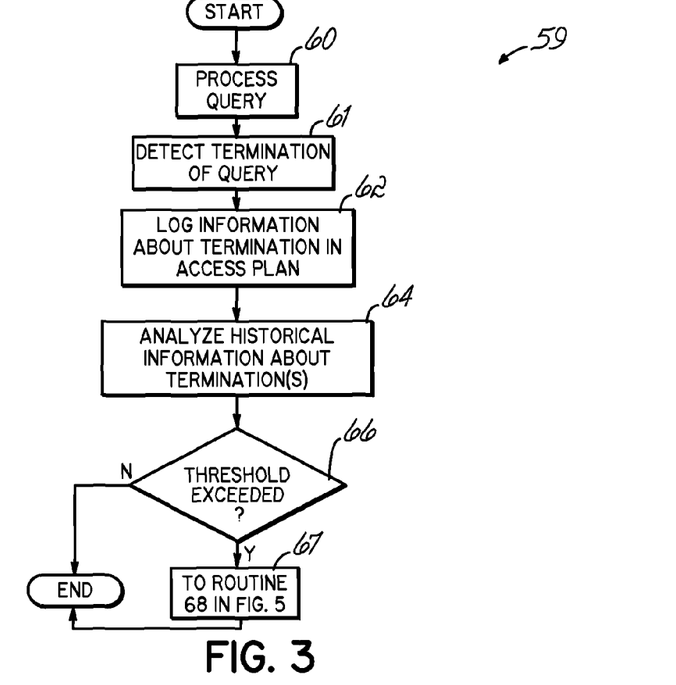
FIG. 3 is a flowchart illustrating the program flow of one implementation of a query processing routine consistent with the invention.
Figure 4:
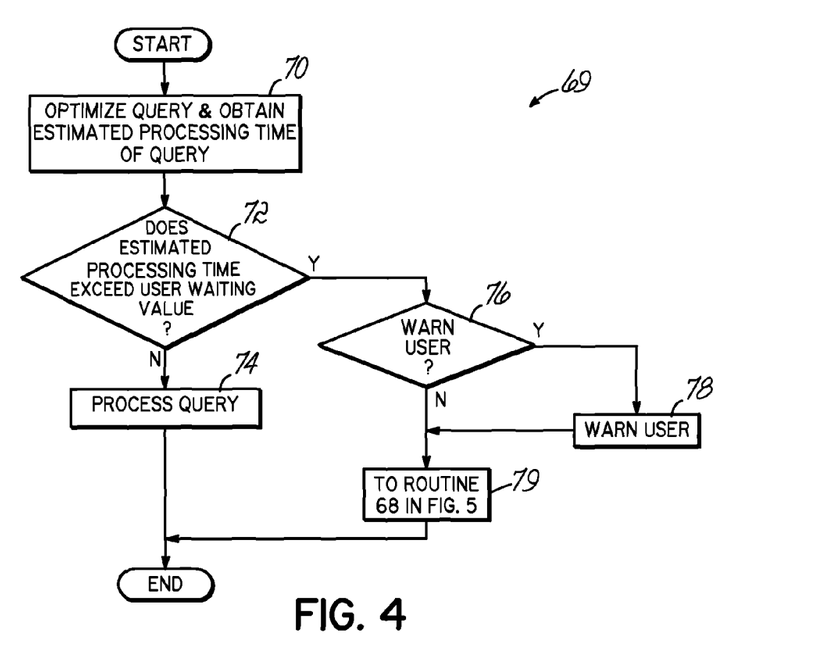
FIG. 4 is a flowchart illustrating the program flow of one implementation of a query optimization routine consistent with the invention.

Now turning to FIG. 3 and FIG. 4, these two figures illustrate two exemplary routines designed to use information associated with at least one premature termination of a database query to improve the processing of queries. FIG. 3 illustrates a query processing routine 59 that may be executed to track termination information associated with a premature termination of processing of a database query and may pass control to suggestion creation routine 68 in FIG. 5. FIG. 4 illustrates a query optimization routine 69 that may be executed to warn a user that the database query the user is executing may spend more time processing than the user's waiting value and/or may pass control to suggestion creation routine 68 in FIG. 5. The suggestion creation routine 68 illustrated in FIG. 5 may be executed to generate and/or implement at least one suggestion that may improve the processing of a database query.

Turning now to routine 59 in FIG. 3 in block 60, a database engine processes a database query using an access plan selected beforehand by a query optimizer. In block 61, a DBMS detects when a user prematurely terminates the processing of the database query. Typically, a user prematurely terminates a query because the query may be processing for what the user considers to be an excessive period of time. In block 62, termination information is logged in an access plan of the database query, thus facilitating the tracking of termination information. As stated previously, termination information consistent with the invention may be practically any information related to the premature termination of a database query. Termination information may be represented using a number of different metrics consistent with the invention. For example, termination information may contain values representing a unit of time such as seconds, minutes, hours, days, months, years, etc. Termination information may include a counter, for example, representing how many times the database query has been terminated, or an identifier such as an identifier for a user. Termination information may also be an exact number, an estimate or an approximation, an average, a whole number, a decimal number, a percentage, etc. Furthermore, termination information may involve a calculation such as incrementing a counter of the number of times the database query has been prematurely terminated. In logging termination information, some embodiments may store and/or update practically any information related to the premature termination of the database query. Additionally, each query may have its own termination information.

In block 64, termination information may be retrieved and/or analyzed from the access plan of the database query. Termination information about the most recent termination logged in block 62 as well as termination information from other premature terminations of the database query may be analyzed individually or together. Those of ordinary skill in the art will appreciate that the termination information may likely be the most useful if it is analyzed together, for example, to determine patterns. Each database query may have its own pattern, or in the alternative, a pattern may be based on many queries in some embodiments.

Next, block 66 determines if the termination information exceeds a threshold. A threshold consistent with the invention may be practically any value that can be compared to another value and vice versa. A threshold may be an exact number, an estimate or an approximation, an average, a whole number, a decimal number, a percentage, etc. There may be more than one threshold and/or each threshold may be a different value. In some embodiments, a threshold may be stored, retrieved, and/or updated in an access plan of the database query. A threshold may also be global and applicable to more than one query.

Returning back to block 66, since termination information of a query may include a counter which tracks how many times the processing of the query is prematurely terminated, if the counter does not exceed a threshold, for example, then the processing of the query prematurely terminates and the exemplary implementation of routine 59 ends. On the other hand, if the counter does exceed the threshold, control passes to block 67. Block 67 represents routine 68 in FIG. 5, an exemplary implementation of a routine that generates and/or implements suggestions to improve the processing of the database query.

Figure 5:
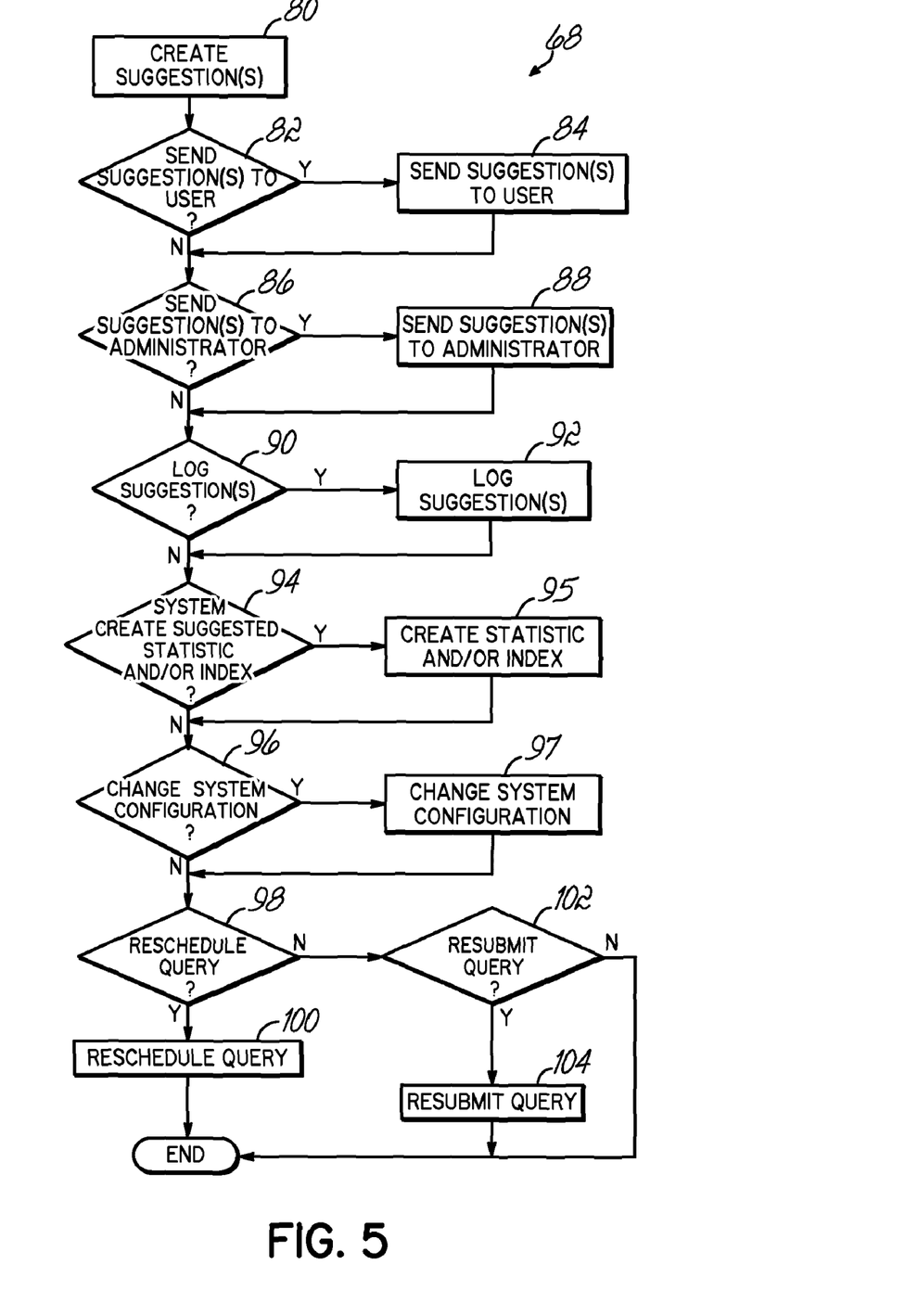
FIG. 5 is a flowchart illustrating the program flow of one implementation of the suggestion creation routine referenced in FIG. 3 and FIG. 4.

Additionally, in routine 59, although the user prematurely terminated the processing of the database query, some embodiments may not terminate the processing of the database query consistent with the invention. Those of ordinary skill in the art may appreciate that the database query may finish processing during the time routine 68 in FIG. 5 is running. Therefore, by continuing to process the database query while routine 68 is running, the user may receive an answer to the database query despite prematurely terminating the processing of the database query. Furthermore, if the query finishes processing before routine 68 completes, any suggestions generated by routine 68 may be stored and/or implemented later. Nonetheless, once routine 68 completes, the exemplary implementation of routine 59 ends. Routine 68 in FIG. 5 will be discussed in greater detail after routine 69 of FIG. 4.

Turning next to routine 69 in FIG. 4, an access plan is selected by the query optimizer to process the query and an estimated processing time of the database query is generated in block 70. However, in block 70, the database query does not begin to process (i.e., fetch records). In block 72, a waiting value of the user who is processing the query is compared to the estimated processing time of the query. A waiting value consistent with the invention may be at least one of an amount of processing time the user approximately waits before terminating processing of a database query, and an amount of processing time the user approximately waits before terminating processing of at least one other database query. A waiting value may be derived from termination information and/or a pattern. Furthermore, a waiting value consistent with the invention may be an exact number, an estimate or an approximation, an average, a whole number, a decimal number, a percentage, etc. A waiting value may be user specific such that the waiting value of one user is different than the waiting value of another user. Additionally, a user may have more than one waiting value. For example, a user may have a waiting value for different types of queries.

A calculation may be used to build a waiting value. The user's waiting value may be calculated from a single query. For example, when a particular query is prematurely terminated more than once by a user, each instance of the prematurely terminated query may have an amount of processing time (i.e., how long the query processed before it was prematurely terminated) associated with it. Therefore, a waiting value may be calculated by summing all the processing times of the instances of the query prematurely terminated by the user, and then, dividing the sum by the number of prematurely terminated instances. On the other hand, a user may prematurely terminate multiple queries, thus multiple prematurely terminated queries may be used to calculate the waiting value of the user. For example, a waiting value may be calculated by summing all the processing times of prematurely terminated queries and/or instances of the prematurely terminated queries, and then, dividing the sum by the number of prematurely terminated queries and instances of the prematurely terminated queries. The processing times for both calculations may be retrieved from the termination information and/or patterns of the database queries. Other techniques may be used as well to build a waiting value consistent with the invention.

Furthermore, a waiting value of a user may be used globally to warn and/or suggest improvements across all the queries the user may process, irrespective of the query or queries used to calculate the waiting value. On the other hand, the waiting value may be used to warn and/or suggest improvements only for the query or queries used to calculate the waiting value. Additionally, a waiting value of a user may be stored, retrieved, and/or updated in an access plan of a database query the user may process (or wants to process) and/or a database query used to calculate the waiting value.

Returning back to block 72, the user's waiting value may be retrieved from the access plan of the database query. Since the waiting value indicates the approximate amount of time the user has historically waited before prematurely terminating processing of database queries, the waiting value is compared to the estimated processing time. Those of ordinary skill in the art may appreciate that the waiting value may function as an indicator of the likelihood that the user will prematurely terminate the database query. If the estimated processing time does not exceed the waiting value of the user, then in block 74, the query begins to process (i.e., fetch records), ending the exemplary implementation of routine 69. On the other hand, if the estimated processing time does exceed the waiting value of the user, control passes to block 76 to potentially warn the user that this query may spend more time processing than the user typically waits before prematurely terminating database queries. Thus, the user may learn early on, before the query begins to fetch records, that the query will process for what the user typically considers to be an excessive amount of time. As a result, the user may avoid wasting his or her time processing the query only to prematurely terminate the query because it is processing for a long time.

Block 76 determines if the user should be warned that the processing of the query may take more time than the user has historically been willing to wait. A user may not want to waste his or her time waiting for a long processing query to finish processing and may want to be warned about long processing queries before the query starts to process. Block 76 may determine that a user should be warned if the user configured his or her preferences to indicate that a warning should be sent. Thus, the user may be warned in block 78. However, a user may not want to be warned. For example, if the user is a database administrator, the database administrator may be aware that the query he or she wants to process may take a long time and does not want to be warned. Thus, if a user's preferences do not indicate the user wants to be warned, the user may not be warned. Alternatively, in some embodiments, if the estimated processing time is close enough to the waiting value of the user, the user may not be warned consistent with the invention. Other techniques may be utilized in some embodiments to determine whether or not a user should be warned consistent with the invention.

Next, control passes to block 79. When control passes to block 79, processing of the query has still not commenced. As in routine 59 in FIG. 3, block 79 passes control to routine 68 in FIG. 5, an exemplary implementation of a routine that generates and/or implements suggestions to improve the processing of a database query. Once routine 68 in FIG. 5 completes, the exemplary implementation of routine 69 in FIG. 4 ends.

Before moving on to routine 68 in FIG. 5, it is worth noting that both routine 59 in FIG. 3 and routine 69 in FIG. 4 may be used to improve the processing of a single database query. For example, when a user wants to process a query, routine 69 may be used to compare the waiting value of the user to the estimated processing time of the query. If the waiting value is exceeded, routine 68 in FIG. 5 may be called. On the other hand, if the waiting value is not exceeded, the query may begin to fetch records. However, if the query spends a long time processing, the user may prematurely terminate the query. Thus, routine 59 may then be used, and if the threshold in routine 59 is exceeded, routine 68 in FIG. 5 may then be called. As a result, both routine 59 in FIG. 3 and routine 69 in FIG. 4 may be used on a single database query, providing two opportunities for suggestions to improve the processing of the query to be generated and/or implemented by routine 68 in FIG. 5. However, some embodiments may only use one of the two routines consistent with the invention. For example, if a waiting value has not been built for a user yet, then only routine 59 in FIG. 3 and not routine 69 in FIG. 4 may be used in some embodiments.

Turning next to routine 68 in FIG. 5, block 80 generates at least one suggestion to improve the processing of a database query. A suggestion consistent with the invention may be any number of operations that improve the processing of a database query such as, but not limited to, rescheduling a query, creating a statistic, creating an index, and/or changing a system configuration. Rescheduling a query may be practically any kind of rescheduling possible such as, but not limited to, rescheduling a whole query, a portion of a query, completely rescheduling a query, partially rescheduling a query, rescheduling at a different time, rescheduling on a different date, etc. A statistic consistent with the invention may be practically any kind of statistic that can be created for a database query such as, but not limited to, column statistics (e.g., number of distinct values (NDV) in column, number of nulls in column, data distribution, histogram, frequent value list (FVL), etc.), table statistics (e.g., number of rows, number of blocks, average row length, etc.), etc. An index consistent with the invention may be practically any type of index that may be created through conventional techniques such as, but not limited to, a radix index and an encoded vector index. Changing a system configuration may be practically any change that can be performed such as, but not limited to, changing the priority of a query, changing a resource allocation, increasing parallelism, etc.

A suggestion may be created for practically any database query including queries prematurely terminated by routine 59 in FIG. 3 and/or queries expected to spend a long time processing by routine 69 in FIG. 4. Furthermore, a suggestion consistent with the invention may be based upon termination information, a pattern, and/or a waiting value. A suggestion may be logged in a trace, job log, database monitor record and/or other medium. Additionally, in some embodiments, a suggestion may be stored, retrieved, and/or updated in an access plan of the database query. Embodiments consistent with the invention may create at least one suggestion.

Returning to block 80, block 80 may automatically diagnose a database query and may automatically generate at least one suggestion. Although block 80 may suggest more than one operation such as creating a statistic, creating an index, and changing a system configuration, only one suggestion may be created in some embodiments. The specific suggestion created in block 80 may be based upon termination information, pattern, and/or a waiting value. For example, a pattern from the termination information of a query may demonstrate that the query is prematurely terminated at approximately a same recurring time. Therefore, a suggestion to reschedule the query for a different time can be created in block 80. Those of ordinary skill in the art may appreciate the benefits of automatically diagnosing and creating suggestions; for example, users may improve queries without implementing difficult tools and/or seeking assistance from an expert.

Next, block 82 determines whether the suggestion(s) created in block 80 should be sent to a user or not. In some embodiments, users may be able to configure their preferences to allow or not allow suggestions to be sent to them. Alternatively, in some embodiments, a suggestion may be based upon past actions of the user. Therefore, if the user's preferences indicate that the user wants to receive suggestions and/or the user always implements suggestions received (discussed in greater detail below), a suggestion may be sent to the user in block 84. A suggestion may be sent to a user by any number of conventional techniques available to convey information. On the other hand, a user may not want to receive a suggestion. Therefore, if the user never implements suggestions and/or the user's preferences do not indicate that the user wants to receive suggestions, a suggestion may not be sent to the user.

Additionally, different techniques may be utilized in some embodiments to determine whether or not to send a suggestion to a user consistent with the invention. For example, a user may be prompted to decide whether or not the user wants to receive a suggestion in some embodiments. Furthermore, in some embodiments the user may also be notified as to why the user received a suggestion. For example, a suggestion to reschedule a query may be accompanied with a message noting that the query is routinely killed every Monday and/or at approximately the same time of day. The message may be based upon termination information and/or a pattern determined from the termination information. Next, control passes to block 86.

Block 86 determines whether the suggestion(s) should be sent to an administrator or not. Those of ordinary skill in the art may appreciate that copies of suggestions sent to users may also be sent to the database administrator. In such a way, the database administrator may be informed of the suggestions as well as the particular queries for which improvements were suggested. Thus, system configurations may be set to automatically send suggestions or copies of suggestions to a database administrator. Additionally, in some embodiments, a user may be prompted to send a copy of the suggestion to the database administrator, or if the user does not want to receive suggestions, the user may arrange for all suggestions to be sent to the database administrator instead of the user. Furthermore, a database administrator may have configured his or her own preferences and may choose to receive suggestions. A suggestion may be sent to the database administrator in block 88. On the other hand, in some instances, the administrator may also be the user processing the database query and the database administrator may not want to receive the same suggestions from block 84. Thus, to avoid duplication and/or if the database administrator's preferences do not indicate he or she wants to receive suggestions, or if a user chooses not to send suggestions to the database administrator, suggestions may not be sent to the database administrator. Additionally, different techniques may be utilized in some embodiments to determine whether or not to send a suggestion to a database administrator consistent with the invention. Next, control passes to block 90.

Block 90 determines whether the suggestion(s) should be logged or not. A suggestion may be logged in a trace, a job log, and/or database monitor record as well as in any other medium. A suggestion may be logged to keep a record of the suggestion. For example, a database administrator can identify suggestions sent to users that were not sent to the database administrator by looking at the logged suggestions. Additionally, logged suggestions can be useful during recovery operations. In some embodiments, logged suggestions may be used by block 80 in creating a suggestion, for example, to avoid a duplicate suggestion. Thus, a suggestion may be logged in block 92. On the other hand, a suggestion may not be logged due to space restrictions. Decisions to log suggestions may be made by a database administrator and/or automatically based upon space restrictions. Additionally, different techniques may be utilized in some embodiments to determine whether or not to log a suggestion consistent with the invention. Next, control passes to block 94.

Block 94 determines whether the system should create any suggested statistic and/or index. A user may be prompted to modify the database configuration by creating a suggested statistic and/or index. In some embodiments, a suggestion to create a statistic and/or index may identify the table referenced in the query that needs the statistic and/or index. Typically, queries trying to access data from poorly configured tables lacking statistics and/or indexes have long processing times; therefore, a user may choose to create a statistic and/or index to improve the processing of the database query. Thus, a statistic and/or index can be created in block 95. On the other hand, a user may choose not to create a statistic. For example, the user does not want to wait the period of time required to create a statistic and/or index. Also, if the user prematurely terminated the query in routine 59 in FIG. 3, the user may have to process a more important query and may not have the time needed to create a suggested statistic and/or index. Thus, the user may choose not to create the suggested statistic and/or index. Additionally, different techniques may be utilized in some embodiments to determine whether or not to create a statistic and/or index consistent with the invention.

Furthermore, in some embodiments, a statistic and/or index may be created in spite of a user's choice to not create a statistic and/or index consistent with the invention. For example, the query may be frequently processed by many users, thus, a system may decide to create the suggested statistic and/or index at a later time and/or in the background. Therefore, even though the user may not want to create the statistic and/or index, the system may still create it, improving the processing of the query and benefiting all users that may process the query.

Next, block 96 determines whether any suggested system configuration change should be carried out or not. A user may be prompted to modify the processing of the query by changing a system configuration. In some embodiments, the user may be presented with more than one change and/or consequences of each selection. Changing a system configuration may be practically any change possible such as but not limited to changing the priority of a query, changing a resource allocation, and/or changing parallelism. Changing a system configuration may not require as much time as creating a statistic and/or index; thus, users who chose not to create a statistic or index in block 94 may choose to change a system configuration in block 96. A system configuration may be changed in block 97. On the other hand, a user may not want to change any configurations for a low priority query, thus no changes may be made. Additionally, different techniques may be utilized in some embodiments to determine whether or not to change a system configuration consistent with the invention.

Next, control may pass to block 98 to determine if the database query should be rescheduled or not. A user may have received a suggestion to reschedule the query in block 80. A user may be prompted to modify the processing of the query by rescheduling the query. Additionally, the user may also be prompted for a better time, date, etc. However, in some embodiments, a better time to reschedule the query may be automatically presented to the user. For example, the user may be presented with a better time which does not significantly affect other queries the user processes. Different techniques may be utilized in some embodiments to determine whether or not to reschedule a database query consistent with the invention. Nonetheless, the user may choose to reschedule the query, and the query may be rescheduled in block 100. Then, irrespective of whether routine 68 was called from routine 59 in FIG. 3 or routine 69 in FIG. 4, the query may process at the time, date, etc. the query is rescheduled for with any system configuration changes made in block 97 and any statistics and/or indexes created in block 95. This completes routine 68.

On the other hand, the user may choose to not reschedule the query or if a suggestion to reschedule the query was not made, control passes to block 102 from block 98. Block 102 determines if the query should be resubmitted. Resubmitting a query may include reoptimizing the query and reprocessing the query from the beginning. The user may be prompted to resubmit the query immediately, and the user may choose to resubmit the query. Typically, if the user has time to wait for the query, the user may choose to resubmit the query. The query may be resubmitted in block 104 to be processed using any system configurations from block 97 and any statistic and/or index created in block 95. The query may begin processing immediately from the beginning, completing routine 68. On the other hand, choosing to resubmit the query in block 102 may require time as the query may start processing from the beginning with the changed system configurations and/or any created statistics and/or indexes. Moreover, the user may have not implemented any suggestions. Thus, the user may choose to not resubmit the query. Different techniques may be utilized in some embodiments to determine whether or not to resubmit a query consistent with the invention.

If the user chooses not to resubmit the query then the query may process without any changes or the query may prematurely terminate depending on whether routine 59 in FIG. 3 or routine 69 in FIG. 4 called routine 68. If routine 68 was called from routine 59, then the user prematurely terminated the database query, and because the user does not want to resubmit the query. The query may remain prematurely terminated. Even if any statistics and/or indexes were created in block 95 and/or a system configuration change was made in block 97, the query may remain prematurely terminated. Additionally, if routine 68 was called from routine 69, the query has not been prematurely terminated yet, thus the query may run without changes. Since the user does not want to resubmit the query, any implemented suggestions may not be used to process the query this time, instead the changes may improve the query once the query is reoptimized (i.e., the new access plan may include any statistics and/or indexes created and/or any system configuration changes). But, the implemented suggestions may be utilized next time the query is processed. Additionally, the user may choose to prematurely terminate the query at any time during the query's processing.

In some embodiments, a query may be rescheduled even if a suggestion to reschedule the query was not made (not shown). For example, if a statistic and/or index was created in block 94 and/or system configuration changed in block 96, and the user cannot resubmit the query immediately, the user may be able to reschedule the query.

Various modifications may be made to the illustrated embodiments without departing from the spirit and scope of the invention. Thus, more than one of a particular suggestion may be created. For example, a suggestion to reschedule a query to a different date, a suggestion to reschedule to a different time, and a suggestion to reschedule a portion of a query may all be created and/or implemented. Furthermore, any examples used in describing any of the illustrated embodiments are not meant to limit the invention. Therefore, the invention lies in the claims hereinafter appended.

What is claimed is:

1. An apparatus, comprising:
   at least one processor;
   a memory; and
   program code resident in the memory and configured to be executed by the at least one processor to process a database query, the program code configured to initiate processing of the database query, detect when at least one user prematurely terminates the processing of the database query, track termination information based upon detection of the user prematurely terminating the processing of the database query, and determine from the termination information a number of times processing of the database query is prematurely terminated.

2. The apparatus of claim 1, wherein the program code is further configured to determine from the termination information at least one of an amount of processing time before processing of the database query is prematurely terminated, a system configuration, and a user that prematurely terminates processing of the database query.

3. The apparatus of claim 1, wherein the program code is further configured to determine from the termination information an amount of processing time before processing of the database query is prematurely terminated.

4. An apparatus, comprising:
   at least one processor;
   a memory; and
   program code resident in the memory and configured to be executed by the at least one processor to process a database query, the program code configured to initiate processing of the database query, detect when at least one user prematurely terminates the processing of the database query, track termination information based upon detection of the user prematurely terminating the processing of the database query, and generate at least one suggestion for improving processing of the database query based upon the termination information of the database query.

5. The apparatus of claim 4, wherein the program code is further configured to perform at least one operation in response to the suggestion, the at least one operation including sending the suggestion to a user, sending the suggestion to a database administrator, logging the suggestion, implementing the suggestion, resubmitting the database query, processing the database query without changes, terminating processing of the database query, and a combination thereof.

6. The apparatus of claim 4, wherein the suggestion includes creating a statistic.

7. The apparatus of claim 4, wherein the suggestion includes creating an index.

8. The apparatus of claim 4, wherein the suggestion includes changing a system configuration.

9. An apparatus, comprising:
   at least one processor;
   a memory; and
   program code resident in the memory and configured to be executed by the at least one processor to process a database query, the program code configured to initiate processing of the database query, detect when at least one user prematurely terminates the processing of the database query, track termination information based upon detection of the user prematurely terminating the processing of the database query, and build a waiting value for a user based upon the detection of the user prematurely terminating the processing of the database query.

10. The apparatus of claim 9, wherein the program code is further configured to generate a suggestion for processing the database query based upon the waiting value for the user processing the database query.

11. The apparatus of claim 9, wherein the program code is further configured to store at least one of a waiting value and termination information in an access plan for the database query.

12. The apparatus of claim 9, wherein the waiting value includes at least one of an amount of processing time the user approximately waits before terminating processing of the database query, or an amount of processing time the user approximately waits before terminating processing of at least one other database query.

13. An apparatus, comprising:
   at least one processor;
   a memory; and
   program code resident in the memory and configured to be executed by the at least one processor to process a database query, the program code configured to initiate processing of the database query, detect when at least one user prematurely terminates the processing of the database query, track termination information based upon detection of the user prematurely terminating the processing of the database query, and store termination information in an access plan for the database query.

14. The apparatus of claim 13, wherein the program code is further configured to update termination information in an access plan for the database query based upon at least one other detection of a user prematurely terminating the processing of the database query.

15. A program product, comprising:
   a program code configured to initiate processing of a database query, detect when at least one user prematurely terminates the processing of the database query, track termination information based upon detection of the user prematurely terminating the processing of the database query, and determine from the termination information when processing of the database query is prematurely terminated; and
   a non-transitory recordable computer readable medium storing the program code.

16. The program product of claim 15, wherein the program code is further configured to determine from the termination information a pattern in how processing of the database query is prematurely terminated.

17. The program product of claim 16, wherein the determined pattern is based upon at least one of multiple premature terminations by many users, multiple premature terminations by a same user, multiple premature terminations at approximately a same recurring time, and multiple premature terminations after approximately a same amount of time of processing of the database query has elapsed.

* * * * *